Figure 1:
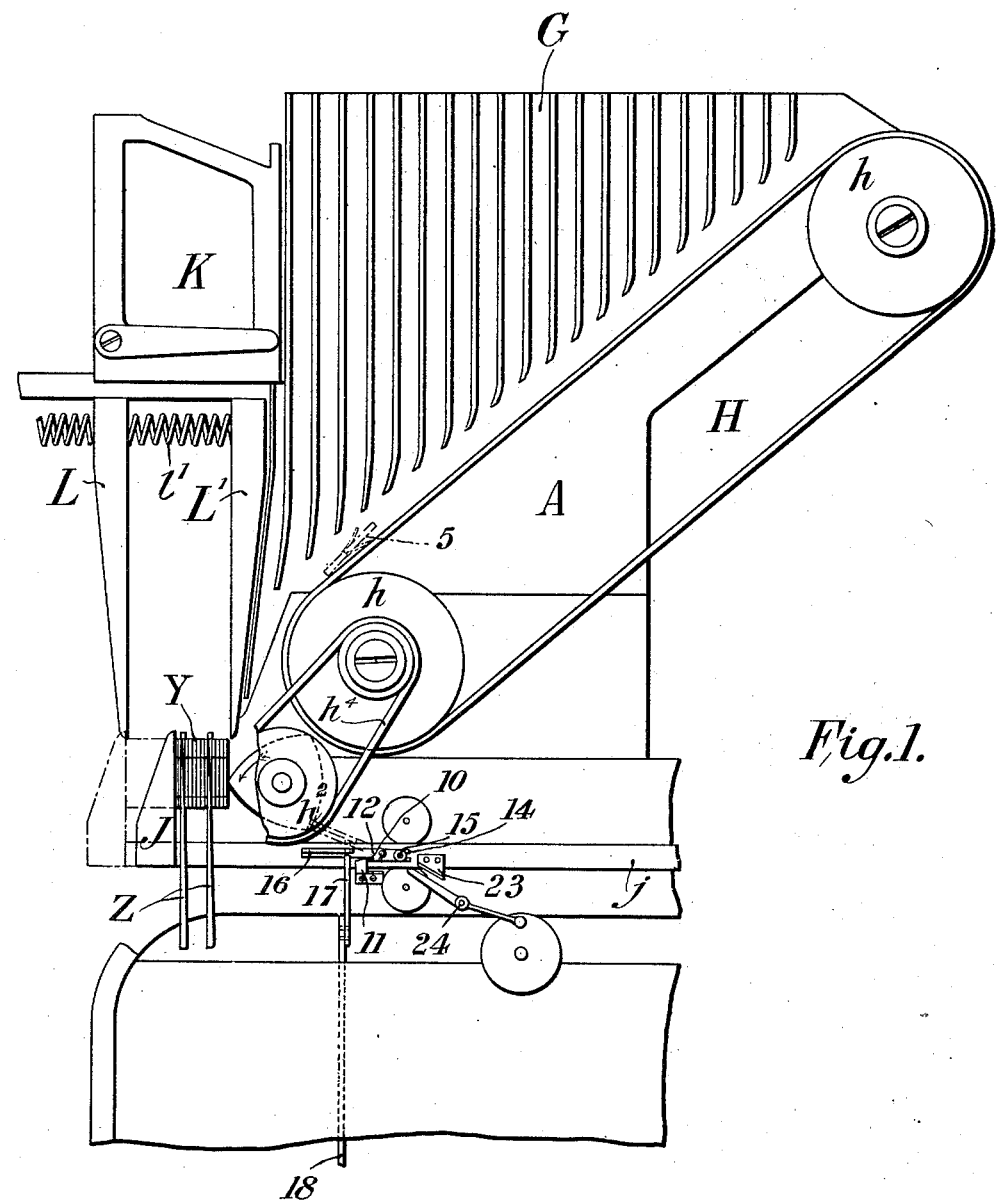

No. 703,248. Patented June 24, 1902.
J. GRAY.
LINOTYPE OR SIMILAR COMPOSING MACHINE.
(Application filed Jan. 23, 1902.)
(No Model.) 6 Sheets—Sheet 1.

Witnesses. Inventor
John Gray
per ___ Attorney.

No. 703,248. Patented June 24, 1902.
J. GRAY.
LINOTYPE OR SIMILAR COMPOSING MACHINE.
(Application filed Jan. 23, 1902.)
(No Model.) 6 Sheets—Sheet 2.

Witnesses.
Inventor
John Gray
per H. Dodge Attorney.

No. 703,248. Patented June 24, 1902.
J. GRAY.
LINOTYPE OR SIMILAR COMPOSING MACHINE.
(Application filed Jan. 23, 1902.)
(No Model.) 6 Sheets—Sheet 3.
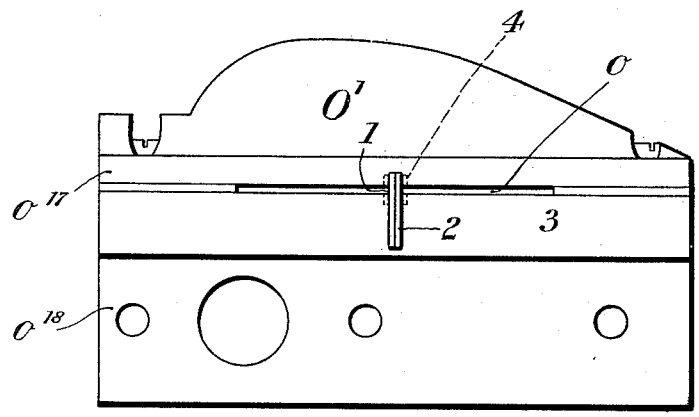
Fig. 4.
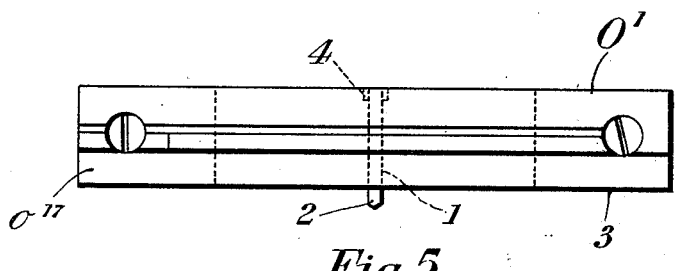
Fig. 5.
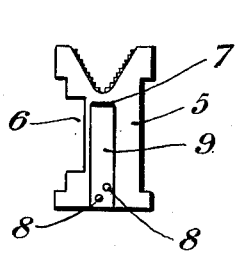
Fig. 6.
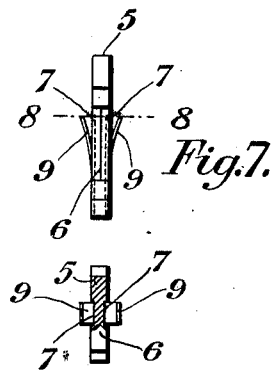
Fig. 7.
Fig. 8.
Witnesses.
Inventor
John Gray
per ____ Attorney.

No. 703,248. Patented June 24, 1902.
J. GRAY.
LINOTYPE OR SIMILAR COMPOSING MACHINE.
(Application filed Jan. 23, 1902.)

(No Model.) 6 Sheets—Sheet 5.

Witnesses. Inventor
John Gray
per
Attorney.

No. 703,248. Patented June 24, 1902.
J. GRAY.
LINOTYPE OR SIMILAR COMPOSING MACHINE.
(Application filed Jan. 23, 1902.)
(No Model.) 6 Sheets—Sheet 6.

Witnesses.

Inventor
John Gray
per Attorney.

UNITED STATES PATENT OFFICE.

JOHN GRAY, OF NEWCASTLE-UPON-TYNE, ENGLAND.

LINOTYPE OR SIMILAR COMPOSING-MACHINE.

SPECIFICATION forming part of Letters Patent No. 703,248, dated June 24, 1902.

Application filed January 23, 1902. Serial No. 90,871. (No model.)

*To all whom it may concern:*

Be it known that I, JOHN GRAY, of Newcastle-upon-Tyne, in the county of Northumberland, England, have invented certain new and useful Improvements in Linotype or Similar Composing-Machines; and I do hereby declare the following to be a full, clear, and exact description of the invention, such as will enable others to make and use the same.

The present invention relates to improvements in means for composing short measures on linotype and similar composing-machines. It is particularly applicable to the assembler-bar and mold of the Mergenthaler linotype-machine described in the specification of United States Letters Patent No. 436,532, and the nature of it will be clearly understood from the following description and accompanying illustrations of it as constructed for composing half-measures on that machine.

The invention has in view particularly the casting in one operation of two or more short slugs or linotypes which are to appear end to end in forms for catalogues, tables, stock-lists, or equivalent printed matter. To this end it comprises a partition dividing the mold-slot into two distinct lengths or sections; also, a projection on the mold between the two slots to divide or assist in dividing the line of matrices in front of the mold into two groups corresponding to the respective sections of the mold; also, a quad, called a "division-quad," to coöperate with the partition in the mold and aid in dividing the matrix-line into the two distinct groups, so that each group may be separately justified; also, means for separately ejecting and assembling the slugs or linotypes produced at one operation, so that those of each group will be kept distinct from those of the other group; also, means for effecting the delivery of the division-quad into the matrix-line during its composition at the proper point.

Figure 2:
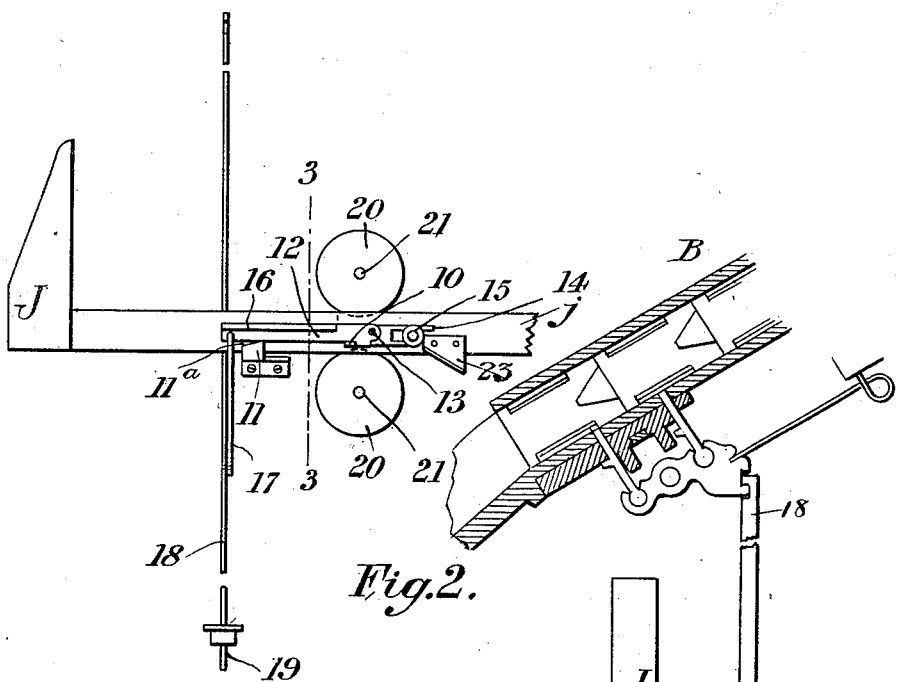
Figure 3:
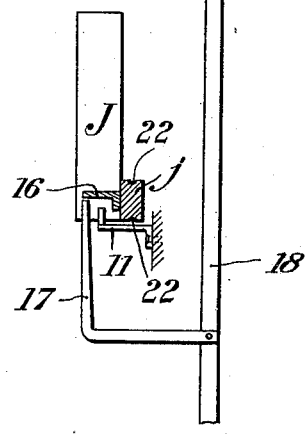
Figure 9:
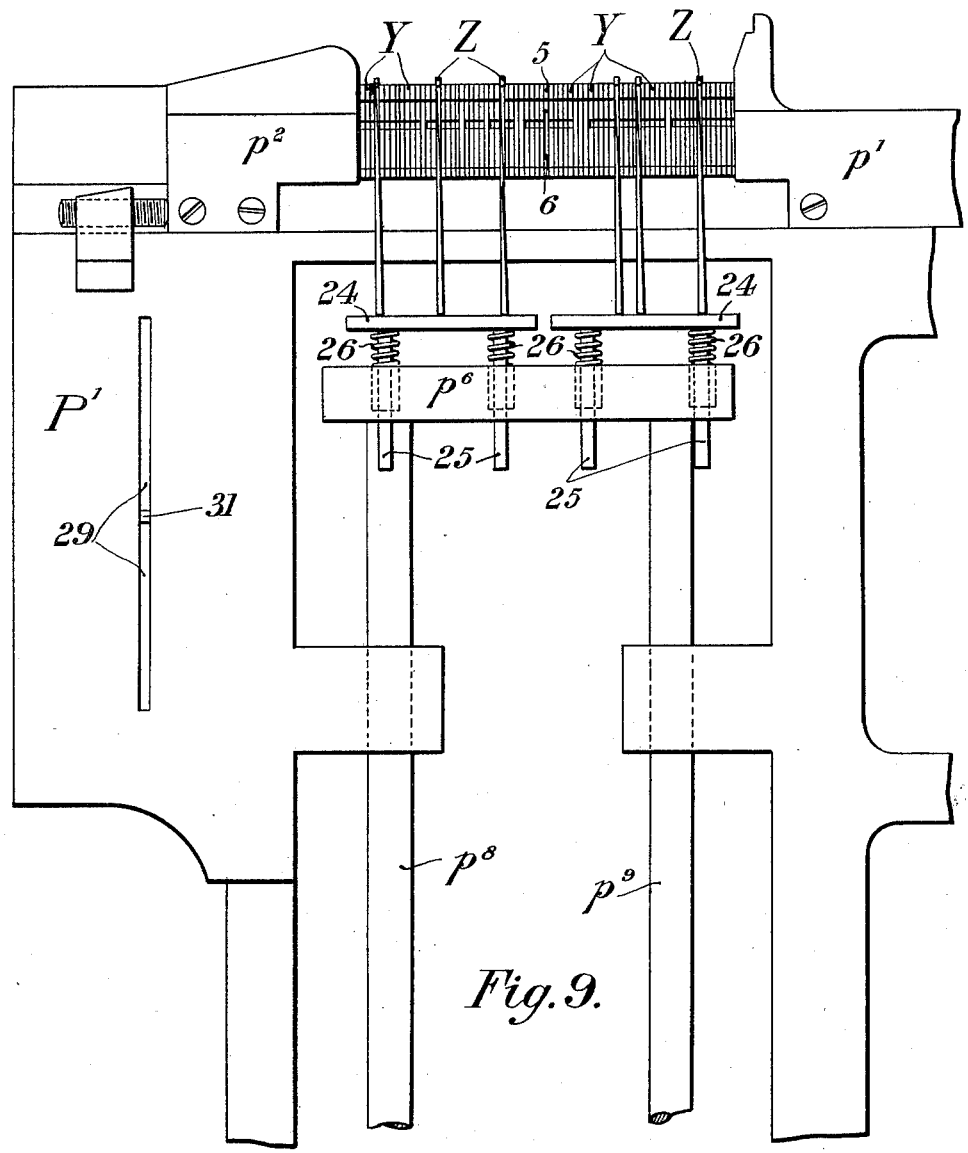
Figure 10:
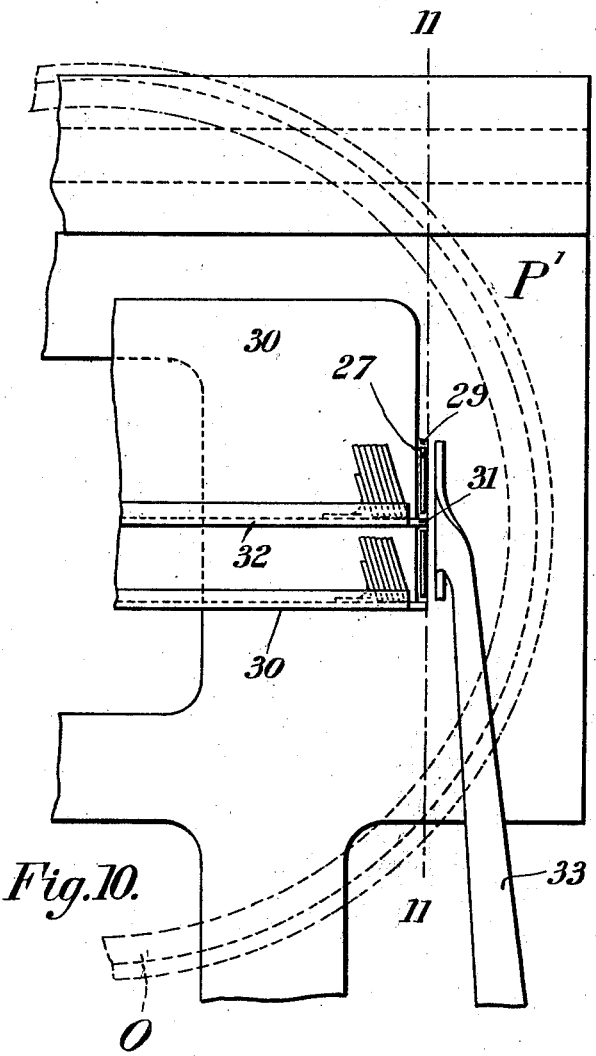

Referring to the accompanying drawings, which are to be taken as part of this specification and read therewith, Figure 1 is a front elevation of sufficient of a linotype-machine to illustrate the application thereto of the present improvements; Fig. 2, a front elevation of the assembler-bar with the improved stop mechanism fitted thereto; Fig. 3, a vertical section on line 3 3 of Fig. 2 looking toward the left, the lower end of the magazine and one of the matrix-delivering escapements being also shown; Fig. 4, a front elevation of the mold-block adapted for casting two half-measure linotypes; Fig. 5, a plan of Fig. 4; Figs. 6 and 7, elevations taken at right angles to each other of one of the special matrix-quads; Fig. 8, a horizontal section on line 8 8 of Fig. 7; Fig. 9, a rear elevation of portions of the vise-frame and justifying mechanism; Fig. 10, a front elevation of a portion of the galley for receiving the half-measure linotypes; and Fig. 11, a vertical section on line 11 11 of Fig. 10, including the linotype-pusher lever.

A is part of the fixed frame of the machine; B, the inclined magazine through which the matrices descend by gravity; F, one of the escapements actuated by a finger-key to effect the release of the division-quads one at a time; P', the vise-frame; $p'$, the movable vise-jaw; $p^2$, the fixed vise-jaw; G, the assembling-guide channels; H, the inclined assembling-belt, traveling upon the two pulleys $h$ $h$; $h^3$, the star-wheel driven by the belt $h^4$; $j$, the assembling-slide bar upon which acts a spring or weight, (not shown in the drawings,) which tends to always move it toward the right of the machine; J, the yielding resistant, fast on the end of the bar $j$; K, the space-bar magazine; L L', "shifter-arms" for moving the assembled line of matrices out of the assembling-block into the elevator, the two last mentioned of which are not shown in the drawings; $l'$, the spring which constantly tends to move the shifter-arm L' toward the left of the machine; O, the mold-wheel; $o$, the mold thereof; $o^{17}$, the cap-plate, and $o^{18}$ the bottom plate of the said mold; Q, one of the two trimming-knives which trim the sides of the linotypes; Y, the matrices, and Z the space-bars. All the above-named parts are as heretofore, and full descriptions of them are to be found in the specification of the before-mentioned Letters Patent No. 436,532, wherein they are identifiable by the same letters of reference as are herein used in relation thereto.

Figure 11:
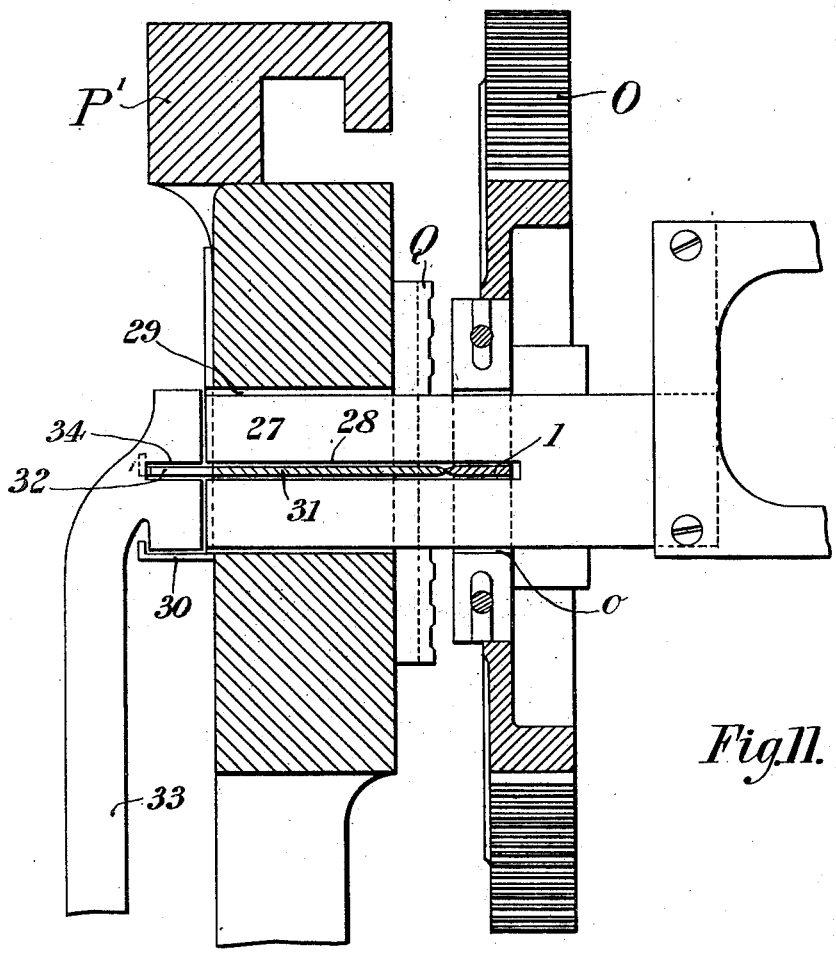

In carrying out the present invention a transverse partition 1, as shown most clearly in Figs. 4, 5, and 11, is fixed across the mold slot or cavity $o$ and carries a nose 2, which projects beyond the front face 3 of the mold-block O'. The partition 1 divides the mold-slot into two independent lengths or sections, in each of which a slug or linotype may be cast in the ordinary manner. Its projecting nose 2 is adapted to project into the line of matrices when they are presented in front of the mold between two of the ordinary matrices, so as to divide the matrix-line into two groups. This partition 1 may be secured in position (against the friction to which it is exposed when the linotypes are being ejected) by having enlargements 4 at its rear edge, which, as shown in dotted lines in Figs. 4 and 5, fit into corresponding recesses in the rear of the mold-block O' above and below the mold-slot o, or the said partition 1 may be secured in position in the manner set forth in the specification of United States Letters Patent No. 609,883 by having a vertical segmental plate at its front end capable of being engaged and released by the mutilated head of a rotatable pin. The most forward edge of the partition 1 is in the form of an angular ridge, for a purpose hereinafter described.

The machine is equipped with a supply of special matrix-quads 5, Figs. 6, 7, 8, and 9, which I denominate "division-quads" and which may be kept either in the sorts-box for composing by hand into the assembling line of matrices or in one of the matrix-compartments for mechanical composition. One of these quads is to be inserted in the composed line of matrices at a suitable point to register with the partition 1 in the mold. The function of the quad, which is locked firmly against lateral motion, is to aid in separating the two groups of matrices and to serve as a stop or abutment between the matrices on the one side and those on the other, so that the two groups may be independently justified in order to coöperate properly with the respective ends or sections of the mold-slot. Each of the special matrix-quads 5 has a cavity 6 in its rear edge to engage with the projecting nose 2 of the transverse partition 1, the bottom or front closed part of the said recess being of angular form, as shown most clearly in horizontal section, Fig. 8, to correspond with the angular form of the said nose. When the nose of mold-partition 2 is seated in the recessed edge of the quad 5, it holds the latter immovably in position, so that the usual justifying-wedges may be actuated to justify the matrices which are on the right side of the quad independently of those which are on the left side. This independent justification is necessary because it may be and generally is the fact that the space required to be filled in order to justify the one group of matrices will be a little more or a little less than that required to justify the other group, for which reason the justifying-wedges of the one group will require to be moved further than those of the other. Each matrix-quad 5 is, moreover, formed with side recesses 7 7, in which are secured, as by rivets 8 8, blade-springs 9 9, capable of being pressed wholly within the recesses 7 7, so that no portion thereof shall project beyond the sides of the matrix-quads. When these springs 9 9 are expanded, as indicated in Figs. 7 and 8, they project beyond the sides of the matrix-quad 5 and in that condition serve to force or hold the two measures of matrices assembled on either side of it a little distance away from it. The springs 9 have no part in the justification of the line. They act only to keep the quad 5 in such position that it will keep the matrices from squabbling and will be engaged by the advancing nose 2 of the mold-partition 1. When the justification takes place, the springs are compressed wholly within the sides of the quad, against which the matrices will bear solidly in the usual manner to close the line and prevent the leakage of the molten metal from the mold between the matrices and the quad.

On the front of the usual assembler slide-bar j is carried a special stop 10, adapted to engage the usual fixed detent 11, so as to stop the assembler-bar j when the first short measure has been composed. This special stop 10, as shown in Figs. 1 and 2, projects forward from the front of a bar 12, pivoted, preferably by a knuckle-joint 13, to a forked or slotted plate 14, which may be secured in any desired position of adjustment on the assembler-bar j by means of the screw or nut 15. On the front of the stop-bar 12 is provided a forwardly-projecting plate or flange 16, which extends over a finger 17, secured to the escapement-rod 18, appropriated to the particular magazine which contains the special matrix-quads 5, so that when this escapement-rod 18 is raised by the respective key-lever 19 for releasing one of the matrix-quads 5 the stop 10 will simultaneously be raised out of engagement with the detent 11. 20 20 are the usual rollers, rotating upon studs 21 21, fixed in the frame A of the machine, which rollers engage with grooves 22 22 in the top and bottom edges of the assembler-bar j for guiding the latter in its longitudinal travel. 23 is the usual full-line stop, and 24, Fig. 1, is the usual alarm mechanism. In Figs. 1 and 2 the stop 10 is represented in full lines in its normal or working position, Fig. 2 showing it as it is before the assembling of the first measure is commenced and Fig. 1 (in full lines) showing it as it is when the assembling of the said first measure is completed.

The before-described apparatus acts as follows: The stop 10 at the time of commencing the assembling of the first short measure of matrices is, as aforesaid, in the position in which it is shown in Fig. 2. The matrices Y and space-bars Z are then assembled, and the assembler-bar j is moved along step by step in the usual way, this operation continuing until when the end of the first measure is reached the progress of the assembler-bar j is arrested by the engagement of the stop 10 with the detent 11, as shown in full lines in Fig. 1. The operator then depresses the key-lever 19, so as to allow one of the special-quad matrices 5 to take its proper place in the assembling line of matrices and at the same time raise the stop 10 into the dotted-line position of Fig. 1, so that the said stop will be disengaged from and pass over the top of the detent 11, and thereby again release the assembler-bar $j$. The assembling of the matrices Y and space-bars Z for the second measure is then proceeded with, and, as usual, when the end of the assembled line is reached the stop 23 engages the detent 11 and arrests the assembler-bar $j$. The line thus composed consists of two groups of ordinary matrices separated by the projection 4 and division-quad 5, the respective groups representing the characters which are to appear on the slugs or linotypes cast in the opposite ends or sections of the mold. The whole composed line is sent to the casting apparatus in the usual way, and when the mold moves forward to it the nose 2 of the partition 1 enters the cavity 6 of the special matrix-quad 5, and by the engagement of the before-described angular surfaces of the nose 2 and cavity 6 the said matrix-quad will be retained in the central position during the subsequent justifying operation. After the transfer of the matrix-line the assembler-bar $j$ returns to its original position, the stop 10 riding over the upper inclined surface $11^a$ and falling behind it. Up to the time that the mold commences its forward movement the matrices and space-bars composing the assembled line are not clamped tightly together, and consequently the before-mentioned springs 9 9 on the special matrix 5 are expanded and serve to hold the matrices Y on either side of it sufficiently apart to allow ample room for the entrance between them of the nose 2 as it enters the cavity 6 and also to keep the quad in position to be engaged by the advancing end of the mold-partition 1. The two short measures divided by the special matrix-quads 5 are then justified independently of each other by the automatic justifier shown in Fig. 9, which comprises the usual continuous justifying-plate $p^6$, operated by two rods $p^8$ and $p^9$, and two separate plates 24 24, each long enough to bear against the tails of all the space-bars Z there may be in the respective measure and short enough to clear the other of such plates. The plates 24 24 are provided with downwardly-depending pins 25 25 fixed therein and passing freely through holes in the plate $p^6$, and they are supported by the springs 26 26, which encircle the said pins 25 25. The respective groups or lines of matrices lying on opposite sides of the fixed quad 5 and confined at their outer ends by the jaws P' and P², respectively, are justified against the quad, which positively limits the length of both lines, so that it is impossible for the justification to elongate either line or group of matrices beyond the predetermined limit.

As shown in Fig. 11, the ejector-blade 27 is formed with a slot 28 to clear the partition 1 of the mold $o$ in the manner shown in the before-mentioned specification of Letters Patent No. 609,883, so that both of the half-measure linotypes are ejected at the same time.

Within the port 29, through which the linotypes are forced by the ejector 27 into the galley 30, and projecting rearward as far as the vertical plane to which the forward edge of the partition 1 is advanced, there is a shelf 31 for keeping the two linotypes apart, and a shelf 32 is provided along the galley 30 for a like purpose, one of the linotypes moving along the top of the shelves 31 32 and the other one moving below the said shelves and along the bottom of the port 29 and galley 30. The lever 33, which, as usual, pushes the linotypes along the galley 30, is slotted at 34 to clear the galley-shelf 32. In this manner the slugs produced in the respective ends of the mold are kept distinct or separate from each other, and all those coming from each end are assembled by themselves.

It will readily be understood that in cases in which the before-described matrix-quads 5 are not contained in the magazine the said quads will be composed into the assembling line by hand, and the stop 10 will be released also by hand from the detent 11 when the assemblage of the matrices and space-bars comprising the first half-measure is complete.

It will be observed that the division-quads 5 are used primarily to effect and maintain the division of the matrix-line and to leave in front thereof, between the two groups of matrices, a cavity or opening for the entrance of the protruding nose 2 on the mold. When the lines are justified, the matrices on the right and left of the nose 2 are of course pressed tightly against its sides, so that the passage of metal between them is impossible.

I believe myself to be the first to provide a linotype-mold having a plurality of sections or slots, end to end, with a projection to enter the line of matrices and divide the same into distinct groups.

I claim—

1. In a linotype-machine, a slotted mold having its slot divided into two lengths, and provided with a projection at the point of division to enter the matrix-line and aid in holding the matrices on opposite sides thereof, that the two groups may be independently justified.

2. In a linotype-machine, a slotted mold having a partition 1 dividing the slot into two independent lengths or sections, and a protruding nose 2 to coöperate with the matrix-line, substantially as described.

3. In a linotype-machine, a slotted mold having its slot divided into distinct lengths or sections, a projection on the face of the mold, two jaws between which the matrix-line is confined in front of the mold, a composed line of matrices, and a quad dividing the composed line into two groups and coöperating with the projection on the mold substantially as described.

4. In a linotype-machine, a slotted mold having its slot divided into two independent lengths or sections and having a projection on its face at the point of division, in combination with a quad adapted to be set in the matrix-line and to interlock with the projection on the mold to resist lateral movement, substantially as described, whereby the quad is adapted to divide the matrix-line into two independently-justifiable groups or short lines.

5. In a linotype-machine, a mold having a projection on its face, in combination with a quad for insertion in the line of matrices, adapted to interlock with the projection on the mold.

6. In a linotype-machine, a slotted mold having its slot divided into two lengths or sections, in combination with a matrix-assembler slide, a special stop to arrest the same at an intermediate point in the composition of the matrix-line, a division-quad, and means for delivering the quad into the line of matrices when the special stop is in action.

7. In a linotype-machine, a matrix recessed to admit a projection on the mold.

8. In a linotype-machine and in combination with the usual character-matrices, a matrix recessed in the front edge, and a mold provided with a projection to enter the recessed matrix.

9. In a linotype-machine, a mold having a projection adapted to enter between the matrices in the composed line and divide the same into two groups or lines.

10. In a linotype-machine and in combination with the usual matrices and means for assembling the same in line, a special quad for dividing the line, and means for delivering said quad into the line at a predetermined point in its length.

11. In a linotype-machine and in combination with the usual matrices and a mold having its slot divided into two independent lengths, a composing mechanism for assembling the matrices in a line to coöperate with both sections of the mold, division-matrices, and means for inserting the division-matrices in the composed line of matrices at a predetermined point, whereby the line is divided into two groups corresponding with the two sections of the mold.

12. In a linotype-machine, the combination of an assembler-slide actuated by the matrix-line as composition progresses, a stop to arrest the assembler-slide before composition of the line is completed, and means for throwing said stop out of action and delivering into the line a dividing-matrix, substantially as described.

13. In a linotype-machine and in combination with an assembler-slide $j$ and a preliminary stop 12 therefor, a magazine and connections for delivering dividing-quads to the line, a finger-key 19, and connections from said key to throw the stop 12 out of action and to effect the delivery of the matrix to the line.

14. In a linotype-machine, the combination of a magazine B and its escapement, the assembler-slide $j$, its preliminary stop 12, the finger-key 19 and connections 17 and 18 from said key to the stop and the escapement respectively.

15. In a type-composing machine the combination with an assembler-bar moving forward with the extension of an assembling line of matrices, a fixed detent on the machine-frame, full-measure and short-measure stops on the assembler-bar, engaging the fixed detent, a special matrix-quad for insertion in the assembling line, having an angular recess, a mold for casting a linotype from the line of matrices, and a partition in the mold with angular surfaces engaging the angular recess, substantially as set forth.

16. In a type-composing machine the combination of a special matrix-quad for insertion in an assembling line of matrices, having a recess in its rear edge, a mold for casting a linotype from said assembled line and a partition in the mold registering with the recess of the special matrix, substantially as set forth.

17. In a type-composing machine the combination with the mold for casting a linotype from an assembled line of matrices and a partition therein for casting said linotype in separate parts, of a special matrix-quad for insertion in the said line of matrices, having a recess in its rear edge for registering with the mold-partition, and springs on the sides of the said special matrix, substantially as set forth.

18. In a type-composing machine a matrix-quad having a recess, but no formative cavity in its rear edge, substantially as set forth.

In testimony that I claim the foregoing as my invention I have hereunto signed my name in the presence of two subscribing witnesses.

JOHN GRAY.

Witnesses:
ROBERT REDPATH,
EDWARD GRACE ATKINSON.